US012809820B2

(12) United States Patent
Zhang et al.

(10) Patent No.: US 12,809,820 B2
(45) Date of Patent: Nov. 24, 2026

(54) DEFRAGMENTATION METHOD, APPARATUS, ELECTRONIC APPARATUS AND COMPUTER-READABLE STORAGE MEDIUM

(71) Applicant: SAMSUNG ELECTRONICS CO., LTD., Suwon-si (KR)

(72) Inventors: Yuanyi Zhang, XiAn (CN); Heng Zhang, XiAn (CN); Wenwen Chen, XiAn (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1 day.

(21) Appl. No.: 18/436,889

(22) Filed: Feb. 8, 2024

(65) Prior Publication Data

US 2025/0068594 A1 Feb. 27, 2025

(30) Foreign Application Priority Data

Aug. 22, 2023 (CN) ........................ 202311062063.5

(51) Int. Cl.
*G06F 16/17* (2019.01)

(52) U.S. Cl.
CPC ................................ *G06F 16/1724* (2019.01)

(58) Field of Classification Search
CPC .................................................. G06F 16/1724
See application file for complete search history.

(56) References Cited

U.S. PATENT DOCUMENTS

| | | | | |
|---|---|---|---|---|
| 10,649,677 | B2 * | 5/2020 | Hashimoto | G06F 12/0246 |
| 10,706,014 | B1 | 7/2020 | Gupta et al. | |
| 10,877,691 | B2 | 12/2020 | Barczak et al. | |
| 11,392,297 | B2 * | 7/2022 | Yang | G06F 3/0679 |
| 12,271,298 | B2 * | 4/2025 | Xiang | G06F 3/0608 |
| 2006/0242155 | A1 * | 10/2006 | Moore | H04L 67/1097 |
| 2007/0230493 | A1 * | 10/2007 | Dravida | H04L 49/9073 370/412 |
| 2010/0281062 | A1 * | 11/2010 | Ushiyama | G06F 16/134 707/E17.012 |
| 2015/0006846 | A1 * | 1/2015 | Youngworth | G06F 3/0619 711/216 |
| 2020/0004447 | A1 * | 1/2020 | Danilov | G06F 3/0638 |
| 2020/0142878 | A1 * | 5/2020 | Varadarajan | G06F 7/14 |
| 2020/0233839 | A1 | 7/2020 | Desai et al. | |

(Continued)

*Primary Examiner* — Vaisahli Shah

(74) *Attorney, Agent, or Firm* — Sughrue Mion, PLLC

(57) ABSTRACT

A defragmentation method may include: acquiring at least one chunk information of data in response to a writing request for the data, wherein the at least one chunk information may include an identification of at least one chunk and a stream identification assigned to data of the at least one chunk; updating a fragmentation degree of each of the at least one chunk and a stream to which the each of the at least one chunk belongs in a chunk index structure to obtain an updated chunk index structure, based on the at least one chunk information, wherein the chunk index structure may include identifications of a plurality of chunks, stream identifications corresponding to the plurality of chunks, and fragmentation degrees of the plurality of chunks; and determining a first chunk to be defragmented, based on the fragmentation degrees of the plurality of chunks in the updated chunk index structure.

18 Claims, 7 Drawing Sheets

(56) References Cited

U.S. PATENT DOCUMENTS

| | | | | |
|---|---|---|---|---|
| 2022/0113899 | A1 | 4/2022 | Jung et al. | |
| 2022/0283934 | A1 | 9/2022 | Zilberstein et al. | |
| 2023/0108949 | A1 | 4/2023 | Moore et al. | |
| 2023/0409217 | A1* | 12/2023 | Ghaly | G06F 3/0679 |
| 2024/0411684 | A1* | 12/2024 | Hamo | G06F 12/0246 |

* cited by examiner

DEFRAGMENTATION METHOD, APPARATUS, ELECTRONIC APPARATUS AND COMPUTER-READABLE STORAGE MEDIUM

This application claims priority under 35 U.S.C. § 119 to Chinese Patent Application No. 202311062063.5, filed on Aug. 22, 2023, in the Chinese Intellectual Property Office, the entire contents of which are incorporated by reference herein.

BACKGROUND

The disclosure relates to a field of data storage technology, and more particularly, to a defragmentation method, apparatus, electronic apparatus, and computer-readable storage medium.

When data storage is performed, defragmentation of file data is required because the file data, when being saved, is often saved not continuously in a storage space, but scattered into different spaces. The related defragmentation techniques for defragmenting a storage device mainly include an Anti-Aging Log-Structured File System (AALFS) technology, an Adaptive Reserved Space (ARS) technology, and a Janus Defragger (Janusd) technology. The related defragmentation techniques may be configured with partial defragmentation, data blocks being discontinuous after defragmentation, high computation overhead, and high communication overhead due to frequent interactions.

SUMMARY

One or more embodiments provide a defragmentation method, apparatus, electronic apparatus, and computer-readable storage medium.

According to an aspect of an example embodiment, a defragmentation method may include: acquiring at least one chunk information of data in response to a writing request for the data, wherein the at least one chunk information may include an identification of at least one chunk and a stream identification assigned to data of the at least one chunk, and a logical address assigned to the data corresponds to a plurality of chunks including the at least one chunk; updating a fragmentation degree of each of the at least one chunk and a stream to which the each of the at least one chunk belongs in a chunk index structure to obtain an updated chunk index structure, based on the at least one chunk information, wherein the chunk index structure may include identifications of the plurality of chunks, stream identifications corresponding to the plurality of chunks, and fragmentation degrees of the plurality of chunks; determining a first chunk to be defragmented, based on the fragmentation degrees of the plurality of chunks in the updated chunk index structure; and transmitting a first logical address and a first stream identification corresponding to the first chunk to a storage device, to enable the storage device to defragment data of the first chunk.

The at least one chunk information further may include: a number of pages of the at least one chunk occupied by the data, and a starting page number of the data in the at least one chunk.

The updating the fragmentation degree of the at least one chunk in the chunk index structure may include: updating the fragmentation degree of the at least one chunk, based on the number of the pages of the at least one chunk occupied by the data and the fragmentation degree of the at least one chunk recorded in the chunk index structure.

The updating the stream to which the at least one chunk belongs in the chunk index structure may include: determining whether the stream identification which may be assigned to the data may be the same as the stream identification corresponding to the at least one chunk in the chunk index structure; and updating the stream identification corresponding to the at least one chunk in the chunk index structure if different.

The chunk index structure may include chunk index structures of each of a plurality of streams. The updating the stream identification corresponding to the at least one chunk in the chunk index structure may include: removing the at least one chunk in the chunk index structure of the stream of the at least one chunk; and adding the at least one chunk to the chunk index structure of the stream to which the data may be assigned.

The method further may include: recording a file writing frequency and/or a file size. The determining the first chunk to be defragmented based on the fragmentation degrees of the plurality of chunks in the updated chunk index structure may include: determining a first file of which the file size may be greater than a first threshold and\or the file writing frequency may be greater than a second threshold; determining a fragmentation degree of a second chunk corresponding to data of the first file, from the chunk index structure of the each of the plurality of streams; based on the fragmentation degree of the second chunk being greater than a third threshold, determining that the second chunk may be the first chunk; and removing a node corresponding to the first chunk from the chunk index structure of a first stream corresponding to the first chunk.

The chunk index structure of the each stream may be a red-black tree, each of the plurality of chunks corresponds to one node, a location of the at least one chunk in the red-black tree may be determined according to the fragmentation degree of the at least one chunk; and the third threshold may be a fragmentation degree of a chunk at a root node of a red-black tree of a stream corresponding to the second chunk.

The method further may include: updating a bitmap of the at least one chunk according to the at least one chunk information, setting the bitmap of the pages occupied by the data to 1; setting the bitmap of the first chunk to 0 and resetting a defragmentation degree of the first chunk, in response to a defragmentation completion message transmitted by the storage device; and adding the first chunk to the chunk index structure of the first stream corresponding to the first chunk. The updating the fragmentation degree of the at least one chunk in the chunk index structure may include: updating the fragmentation degree of the at least one chunk, based on the number of the pages of the at least one chunk occupied by the data, the fragmentation degree of the at least one chunk recorded in the chunk index structure, and the 1 in the bitmap of the at least one chunk.

The method further may include: receiving address update information transmitted by the storage device, the address update information may include a logical address and a physical address of data; determining an identification of a corresponding chunk and an identification of a page based on the logical address; and setting the page corresponding to the identification of the page to 1 based on the identification of the corresponding chunk and the identification of the page.

The storage device may defragment the data of the first chunk by: defragmenting the data of the first chunk using a Host Initiated Defrag (HID).

According to an aspect of an example embodiment, a defragmentation apparatus may include: at least one memory storing instructions; and at least one processor configured to execute the instructions to: determine at least one chunk information of data in response to a writing request for the data, wherein a logical address which may be assigned to the data corresponds to at least one chunk, each chunk corresponds to one chunk information, each chunk information may include an identification of at least one chunk and a stream identification which may be assigned to the data of the at least one chunk; update a fragmentation degree of the at least one chunk and a stream to which the at least one chunk belongs in a chunk index structure to obtain an updated chunk index structure, based on the at least one chunk information, wherein the chunk index structure may include identifications of a plurality of chunks, stream identifications corresponding to the plurality of chunks, and fragmentation degrees of the plurality of chunks; determine a first chunk to be defragmented based on the fragmentation degrees of the plurality of chunks in the updated chunk index structure; and transmit a first logical address and a first stream identification corresponding to the first chunk to a storage device, to enable the storage device to defragment data of the first chunk.

The chunk information further may include: a number of pages of the at least one chunk occupied by data, and a starting page number of the data in the at least one chunk.

The at least one processor may be further configured to execute the instructions to: update the fragmentation degree of the at least one chunk in the chunk index structure by: updating the fragmentation degree of the at least one chunk, based on the number of the pages of the at least one chunk occupied by the data and the fragmentation degree of the at least one chunk recorded in the chunk index structure.

The at least one processor may be further configured to execute the instructions to update the stream to which the at least one chunk belongs in the chunk index structure belongs by: determining whether the stream identification which may be assigned to the data may be the same as the stream identification corresponding to the at least one chunk in the chunk index structure; and updating the stream identification corresponding to the at least one chunk in the chunk index structure if different.

The chunk index structure may include chunk index structures of each a plurality of streams, and the at least one processor may be further configured to execute the instructions to update the stream identification corresponding to the at least one chunk in the chunk index structure if different, by: removing the at least one chunk in the chunk index structure of the stream of the at least one chunk; and adding the at least one chunk to the chunk index structure of the stream to which the data may be assigned.

The at least one processor may be further configured to execute the instructions to: record a file writing frequency and/or a file size; and determine the first chunk to be defragmented based on the fragmentation degrees of the plurality of chunks in the updated chunk index structure by: determining a first file of which the file size may be greater than a first threshold and/or the file writing frequency may be greater than a second threshold; determining a fragmentation degree of a second chunk corresponding to data of the first file, from the chunk index structure of the each stream; if the fragmentation degree of the second chunk may be greater than a third threshold, determining the second chunk as the first chunk; and removing a node corresponding to the first chunk from the chunk index structure of a first stream corresponding to the first chunk.

The chunk index structure of each stream may be a red-black tree, each of the plurality of chunks corresponds to one node, a location of the at least one chunk in the red-black tree may be determined according to the fragmentation degree of the at least one chunk; and the third threshold may be a fragmentation degree of a chunk at a root node of a red-black tree of a stream corresponding to the second chunk.

The at least one processor may be further configured to execute the instructions to: update a bitmap of the at least one chunk according to the at least one chunk information, setting the bitmap of the pages occupied by the data to 1; and update the fragmentation degree of the at least one chunk in the chunk index structure by: updating the fragmentation degree of the at least one chunk, based on the number of the pages of the at least one chunk occupied by the data, the fragmentation degree of the at least one chunk recorded in the chunk index structure, and the number of 1 in the bitmap of the at least one chunk; set the bitmap of the first chunk to 0 and reset a defragmentation degree of the first chunk, in response to a defragmentation completion message transmitted by the storage device; and add the first chunk to the chunk index structure of the first stream corresponding to the first chunk.

The at least one processor may be further configured to execute the instructions to: receive address update information transmitted by the storage device, the address update information may include a logical address and a physical address of data; determine an identification of a corresponding chunk and an identification of a page based on the logical address; and set the page corresponding to the identification of the page to 1 based on the identification of the corresponding chunk and the identification of the page.

The storage device may defragment the data of the first chunk by: defragmenting the data of the first chunk using a Host Initiated Defrag (HID).

According to an aspect of an example embodiment, an electronic defragmentation apparatus may include: at least one processor; and at least one memory storing computer executable instructions. The computer executable instructions, when being executed by the at least one processor, cause the at least one processor to perform the defragmentation method.

According to an aspect of an example embodiment is a computer-readable storage medium. Instructions in the computer-readable storage medium, when being executed by at least one processor, cause the at least one processor to perform the defragmentation method.

It should be understood that the general description above and the detailed description in the following are only illustrative and explanatory, and do not limit this disclosure.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
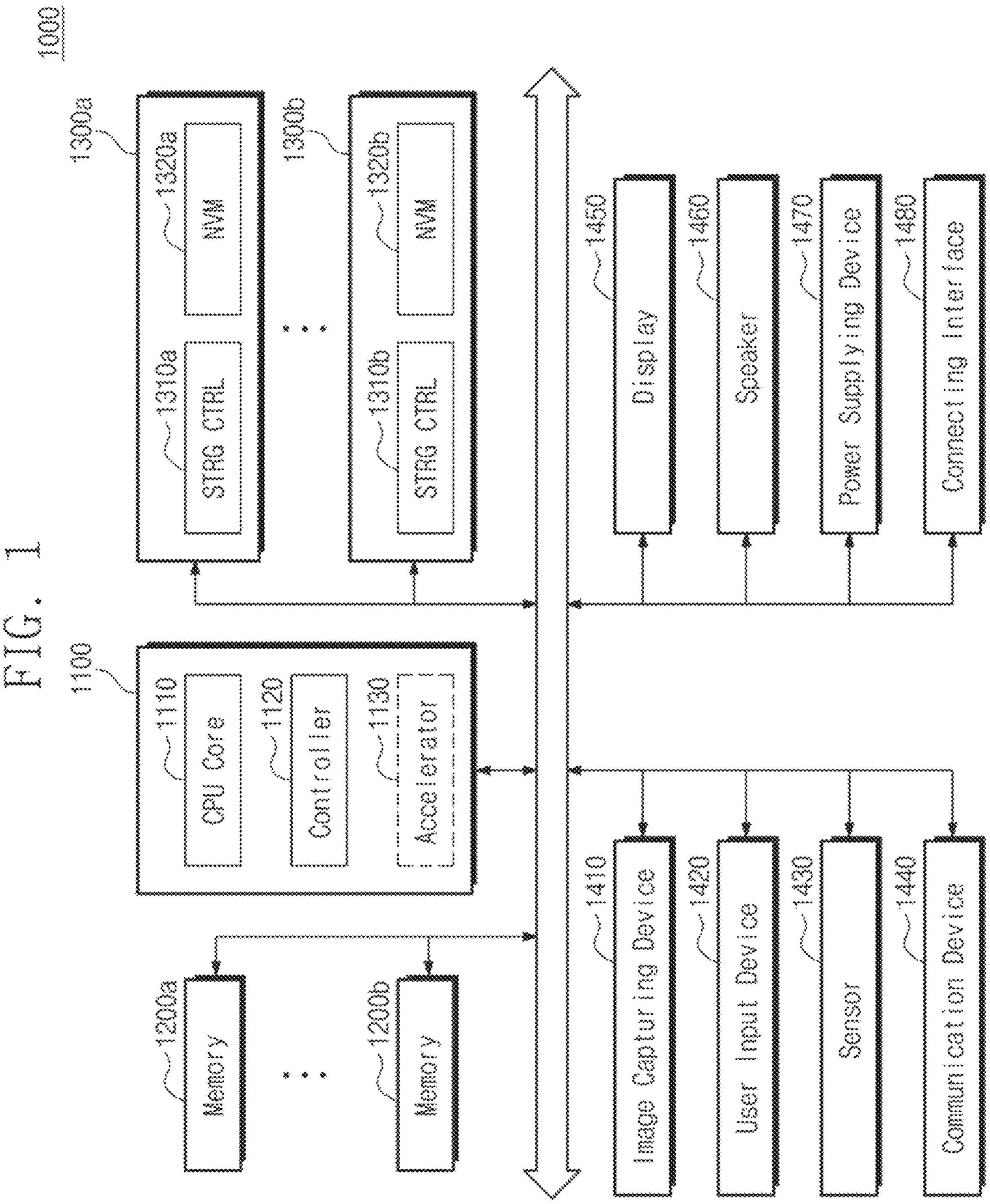
FIG. 1 illustrates a schematic diagram of a system 1000 to which a storage device is applied, according to an embodiment of the disclosure.

An example of defragmentation method, apparatus, electronic apparatus, and computer-readable storage medium may improve an input/output (I/O) performance of a mobile platform.

In order to enable those ordinary skilled in the art to better understand the technical solution of the disclosure, technical solutions in embodiments of the disclosure will be described clearly and completely in combination with the accompanying drawings.

It should be noted that terms “first”, “second”, etc. in the specification and claims as well as the accompanying drawings above of the disclosure are used to distinguish similar objects and need not be used to describe a specific order or sequence. It should be understood that such used data may be interchanged, when appropriate, so that the embodiments of the disclosure described herein can be implemented in an order other than those illustrated or described herein. The embodiments described in the following examples do not represent all embodiments that are consistent with the disclosure. On the contrary, they are merely examples of apparatuses and methods that are consistent with some aspects of the disclosure, as detailed in the claims.

It should be noted here that “at least one of several items” appearing in the disclosure all means that there are three kinds of juxtaposition situations: “any one of these items”, “combination of any number of these items”, and “all of these items”. For example, “including at least one of A and B” or “including at least one of A or B” includes the following three juxtaposition situations: (1) including A; (2) including B; (3) including A and B. As another example, “performing at least one of steps 1 and 2” or “performing at least one of steps 1 or 2” means the following three juxtaposition situations: (1) performing step 1; (2) performing step 2; (3) performing steps 1 and 2.

The related defragmentation techniques for defragmenting a storage (e.g., a Universal Flash Storage (UFS)) device mainly include an AALFS technology, an ARS technology, and a Janusd technology. The related defragmentation techniques are firstly described below.

Specifically, the AALFS technology is a defragmentation scheme based on a Log-Structured File System (LFS), wherein the LFS uses a Garbage Collection (GC) mechanism and the AALFS performs defragmentation using the GC. When the GC in the AALFS selects a victim segment, it calculates a fragmentation degree of each segment, in addition to the number of valid blocks. A segment with more valid blocks or higher fragmentation degree is more likely to be selected. The GC then moves the valid blocks belonging to different files in the victim segment, into different segments, and moves a plurality of valid blocks belonging to the same file into the segment in an order of file offsets. The AALFS technique performing fragmentation by the GC has two main drawbacks. On one hand, the GC modified using the AALFS technique requires more computational overhead, which increases a latency of I/O operations. On the other hand, the defragmentation for a file by the AALFS technique is only local, not global, and the victim segment selected by GC is likely to include only a part of non-contiguous data blocks of a file, so that even after defragmentation, logical addresses of these data blocks are still non-contiguous, in other words, there is still a file fragmentation problem after defragmentation for the file using the AALFS.

The ARS technology is a solution to prevent file fragmentation based on a Flash-Friendly File System (F2FS). The ARS technology firstly uses machine learning to learn a model, to identify a file that will be repeatedly updated or supplemented after it is created, i.e., a growth files. When a new file is created, the ARS technology determines whether the file is a growth file based on the previously learned model, and if so, pre-allocates a certain range of contiguous space for this file. When a size of the file grows at a later stage, new data blocks are supplemented to the pre-allocated space and logical addresses of the new data blocks of this file are not mixed with data blocks of other files, thereby preventing increasing fragmentation degree of the file. Since the ARS technique uses the machine learning for classification when creating files, the computational overhead is high, which increases a delay in creating files. In addition, the pre-allocating space for files by the ARS technique wastes space of a storage device.

The Janusd technology requires collaboration between a file system and a storage device to complete defragmentation, which is divided into two parts: a JanusdL technology for logical defragmentation and a JanusdP technology for physical defragmentation. After a user triggers defragmentation of the Janusd technology, the JanusdL technology analyzes a logical fragmentation degree of a file and the JanusdP technology looks for a file with a high update frequency. For a file with a high logical fragmentation degree, the JanusdL obtains an existing logical address range of the file through the file system and looks for a section of continuous free logical address range as a new address. The JanusdL technology then transmits the existing logical address and the new address of this file to the storage device via a command, and the storage device modifies a Logical address (LBA) to the Physical address (PBA) Table (L2P Table) corresponding to this file and replaces the existing logical address with the new address. Finally, the file system updates the logical address of this file as the new address. For a file with a high access frequency, the JanusdP technique transmits the logical address of this file to the storage device, the storage device performs physical fragmentation analysis, and defragmentation is performed by moving if the fragmentation degree is high. The Janusd technique for defragmenting a file with a high update frequency has a drawback of high communication overhead. In addition, a current widely used electronic apparatus (e.g., a smartphone) often uses a F2FS, which uses an offsite update policy, which makes it likely that the logical addresses of the frequently updated file are scattered in a large number of discrete logical address sections. Therefore, in order to transmit the full logical address section of a single file to the storage device, the Janusd technology requires a plurality of interactions with the storage device, which results in a high communication overhead.

As described above, the related art exists at least the above deficiencies, and based on these, the disclosure provides a defragmentation method, apparatus, electronic apparatus, and computer-readable storage medium that addresses at least the above problems of the related art. The defragmentation method, apparatus, electronic apparatus, and computer-readable storage medium according to embodiments of the disclosure use a streaming technology (e.g., a Streamed Host Initiated Defragmentation (HID)) to defragment for each stream individually, which can reduce file fragmentation generated during use of an electronic apparatus, and improve the overall performance of the electronic apparatus. And, a defragmentation effect can be further improved by separately defragmenting data belonging to different streams of a file because a life cycle of the data in each stream is close to each other. In addition, the defragmentation method, apparatus, electronic apparatus, and computer-readable storage medium according to embodiments of the disclosure use a Host Performance Booster (HPB) technology to sense whether a data block is moved by a UFS device, thereby improving an accuracy of calculating file fragmentation. In addition, the defragmentation method and the defragmentation apparatus according to embodiments of the disclosure can avoid increasing a garbage collection overhead or a communication overhead with the storage device, increasing an I/O operation latency, or wasting a storage space, etc. Various embodiments according to the disclosure will be described below in connection with FIGS. 1 to 7.

FIG. 1 illustrates a schematic diagram of a system 1000 with a storage device applied according to an embodiment of the disclosure. The system 1000 of FIG. 1 may basically be a mobile system, such as a portable communication terminal (e.g., a mobile phone), a smartphone, a tablet personal computer (PC), a wearable device, a healthcare device, or an Internet of things (IoT) device. However, the system 1000 of FIG. 1 is not necessarily limited to the mobile system and may be a PC, a laptop computer, a server, a media player, or an automotive device (e.g., a navigation device).

Referring to FIG. 1, the system 1000 may include a main processor 1100, memories (e.g., 1200*a* and 1200*b*), and storage devices (e.g., 1300*a* and 1300*b*). In addition, the system 1000 may include at least one of an image capturing device 1410, a user input device 1420, a sensor 1430, a communication device 1440, a display 1450, a speaker 1460, a power supplying device 1470, or a connecting interface 1480.

The main processor 1100 may control all operations of the system 1000, more specifically, operations of other components included in the system 1000. The main processor 1100 may be implemented as a general-purpose processor, a dedicated processor, or an application processor.

The main processor 1100 may include at least one CPU core 1110 and further include a controller 1120 configured to control the memories 1200*a* and 1200*b* and/or the storage devices 1300*a* and 1300*b*. In some embodiments, the main processor 1100 may further include an accelerator 1130, which is a dedicated circuit for a high-speed data operation, such as an artificial intelligence (AI) data operation. The accelerator 1130 may include a graphics processing unit (GPU), a neural processing unit (NPU) and/or a data processing unit (DPU) and be implemented as a chip that is physically separate from the other components of the main processor 1100.

The memories 1200*a* and 1200*b* may be used as main memory devices of the system 1000. Although each of the memories 1200*a* and 1200*b* may include a volatile memory, such as static random access memory (SRAM) and/or dynamic RAM (DRAM), each of the memories 1200*a* and 1200*b* may include non-volatile memory, such as a flash memory, phase-change RAM (PRAM) and/or resistive RAM (RRAM). The memories 1200*a* and 1200*b* may be implemented in the same package as the main processor 1100.

The storage devices 1300*a* and 1300*b* may serve as non-volatile storage devices configured to store data regardless of whether power is supplied thereto, and have larger storage capacity than the memories 1200*a* and 1200*b*. The storage devices 1300*a* and 1300*b* may respectively include storage controllers (STRG CTRL) 1310*a* and 1310*b* and NVM (Non-Volatile Memory) s 1320*a* and 1320*b* configured to store data via the control of the storage controllers 1310*a* and 1310*b*. Although the NVMs 1320*a* and 1320*b* may include flash memories having a two-dimensional (2D) structure or a three-dimensional (3D) V-NAND structure, the NVMs 1320*a* and 1320*b* may include other types of NVMs, such as PRAM and/or RRAM.

The storage devices 1300*a* and 1300*b* may be physically separated from the main processor 1100 and included in the system 1000 or implemented in the same package as the main processor 1100. In addition, the storage devices 1300*a* and 1300*b* may have types of solid-state devices (SSDs) or memory cards and be removably combined with other components of the system 1000 through an interface, such as the connecting interface 1480 that will be described below. The storage devices 1300*a* and 1300*b* may be devices to which a standard protocol, such as a universal flash storage (UFS), an embedded multi-media card (eMMC), or a non-volatile memory express (NVMe), is applied, without being limited thereto.

The image capturing device 1410 may capture still images or moving images. The image capturing device 1410 may include a camera, a camcorder, and/or a webcam.

The user input device 1420 may receive various types of data input by a user of the system 1000 and include a touch pad, a keypad, a keyboard, a mouse, and/or a microphone.

The sensor 1430 may detect various types of physical quantities, which may be obtained from the outside of the system 1000, and convert the detected physical quantities into electric signals. The sensor 1430 may include a temperature sensor, a pressure sensor, an illuminance sensor, a position sensor, an acceleration sensor, a biosensor, and/or a gyroscope sensor.

The communication device 1440 may transmit and receive signals between other devices outside the system 1000 according to various communication protocols. The communication device 1440 may include an antenna, a transceiver, and/or a modem.

The display 1450 and the speaker 1460 may serve as output devices configured to respectively output visual information and auditory information to the user of the system 1000.

The power supplying device 1470 may appropriately convert power supplied from a battery embedded in the system 1000 and/or an external power source, and supply the converted power to each of components of the system 1000.

The connecting interface 1480 may provide connection between the system 1000 and an external device, which is connected to the system 1000 and capable of transmitting and receiving data to and from the system 1000. The connecting interface 1480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

Figure 2:
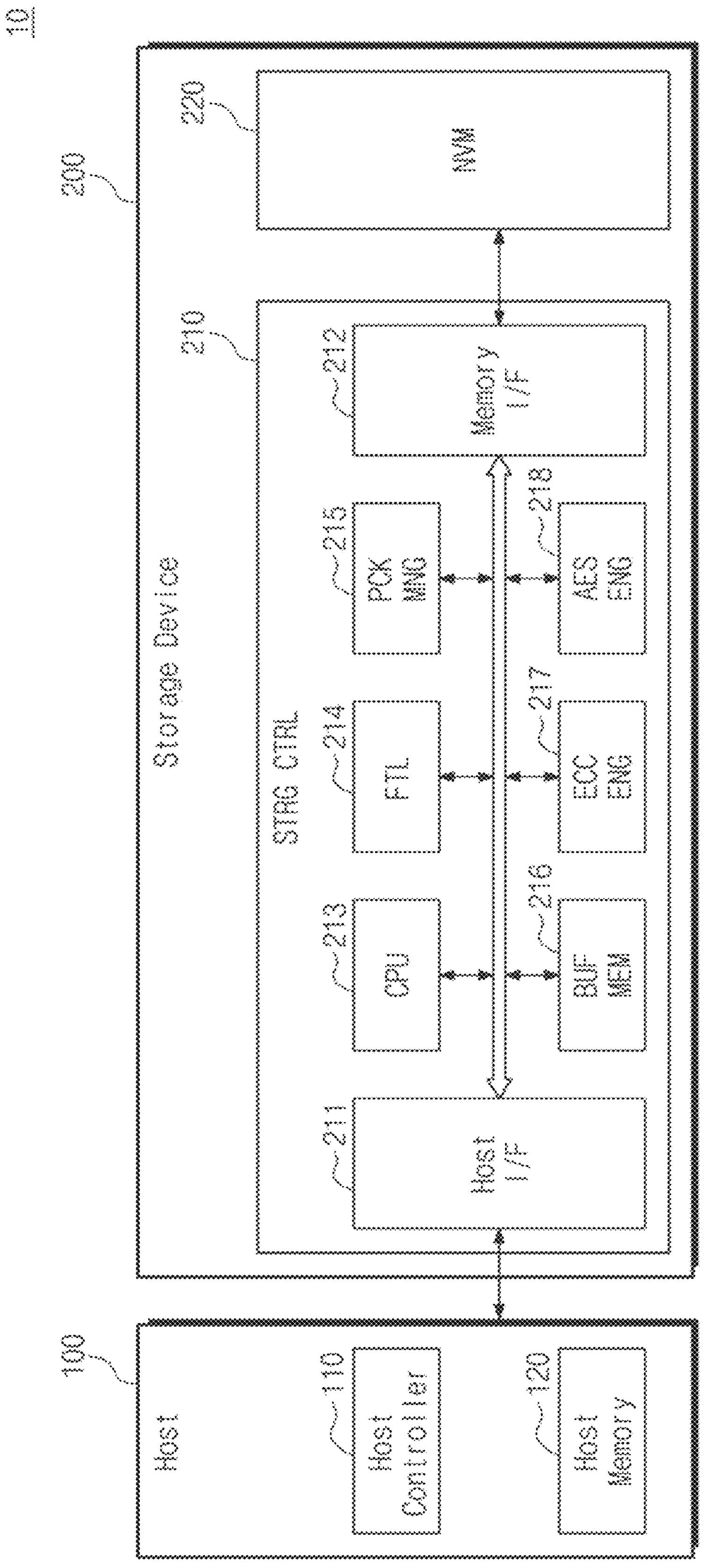
FIG. 2 illustrates a block diagram of a host storage system 10 according to an embodiment of the disclosure.

FIG. 2 is a block diagram of a host storage system 10 according to an example embodiment.

The host storage system 10 may include a host 100 and a storage device 200. Further, the storage device 200 may include a storage controller 210 and an NVM 220. According to an example embodiment, the host 100 may include a host controller 110 and a host memory 120. The host memory 120 may serve as a buffer memory configured to temporarily store data to be transmitted to the storage device 200 or data received from the storage device 200.

The storage device 200 may include storage media configured to store data in response to requests from the host 100. As an example, the storage device 200 may include at least one of an SSD, an embedded memory, or a removable external memory. When the storage device 200 is an SSD, the storage device 200 may be a device that conforms to an NVMe standard. When the storage device 200 is an embedded memory or an external memory, the storage device 200 may be a device that conforms to a UFS standard or an eMMC standard. Each of the host 100 and the storage device 200 may generate a packet according to an adopted standard protocol and transmit the packet.

When the NVM 220 of the storage device 200 includes a flash memory, the flash memory may include a 2D NAND memory array or a 3D (or vertical) NAND (VNAND) memory array. As another example, the storage device 200 may include various other kinds of NVMs. For example, the storage device 200 may include magnetic RAM (MRAM), spin-transfer torque MRAM, conductive bridging RAM (CBRAM), ferroelectric RAM (FRAM), PRAM, RRAM, and various other kinds of memories.

According to an embodiment, the host controller 110 and the host memory 120 may be implemented as separate semiconductor chips. Alternatively, in some embodiments, the host controller 110 and the host memory 120 may be integrated in the same semiconductor chip. As an example, the host controller 110 may be any one of a plurality of modules included in an application processor (AP). The AP may be implemented as a System on Chip (SoC). Further, the host memory 120 may be an embedded memory included in the AP or an NVM or memory module located outside the AP.

The host controller 110 may manage an operation of storing data (e.g., write data) of a buffer region of the host memory 120 in the NVM 220 or an operation of storing data (e.g., read data) of the NVM 220 in the buffer region.

The storage controller 210 may include a host interface 211, a memory interface 212, and a CPU 213. Further, the storage controllers 210 may further include a flash translation layer (FTL) 214, a packet manager 215, a buffer memory 216, an error correction code (ECC) engine 217, and an advanced encryption standard (AES) engine 218. The storage controllers 210 may further include a working memory in which the FTL 214 is loaded. The CPU 213 may execute the FTL 214 to control data write and read operations on the NVM 220.

The host interface 211 may transmit and receive packets to and from the host 100. A packet transmitted from the host 100 to the host interface 211 may include a command or data to be written to the NVM 220. A packet transmitted from the host interface 211 to the host 100 may include a response to the command or data read from the NVM 220. The memory interface 212 may transmit data to be written to the NVM 220 to the NVM 220 or receive data read from the NVM 220. The memory interface 212 may be configured to comply with a standard protocol, such as Toggle or open NAND flash interface (ONFI).

The FTL 214 may perform various functions, such as an address mapping operation, a wear-leveling operation, and a garbage collection operation. The address mapping operation may be an operation of converting a logical address received from the host 100 into a physical address used to actually store data in the NVM 220. The wear-leveling operation may be a technique for preventing excessive deterioration of a specific block by allowing blocks of the NVM 220 to be uniformly used. As an example, the wear-leveling operation may be implemented using a firmware technique that balances erase counts of physical blocks. The garbage collection operation may be a technique for ensuring usable capacity in the NVM 220 by erasing an existing block after copying valid data of the existing block to a new block.

The packet manager 215 may generate a packet according to a protocol of an interface, which consents to the host 100, or parse various types of information from the packet received from the host 100. In addition, the buffer memory 216 may temporarily store data to be written to the NVM 220 or data to be read from the NVM 220. Although the buffer memory 216 may be a component included in the storage controllers 210, the buffer memory 216 may be outside the storage controllers 210.

The ECC engine 217 may perform error detection and correction operations on read data read from the NVM 220. More specifically, the ECC engine 217 may generate parity bits for write data to be written to the NVM 220, and the generated parity bits may be stored in the NVM 220 together with write data. During the reading of data from the NVM 220, the ECC engine 217 may correct an error in the read data by using the parity bits read from the NVM 220 along with the read data, and output error-corrected read data.

The AES engine 218 may perform at least one of an encryption operation or a decryption operation on data input to the storage controllers 210 by using a symmetric-key algorithm.

Figure 3:
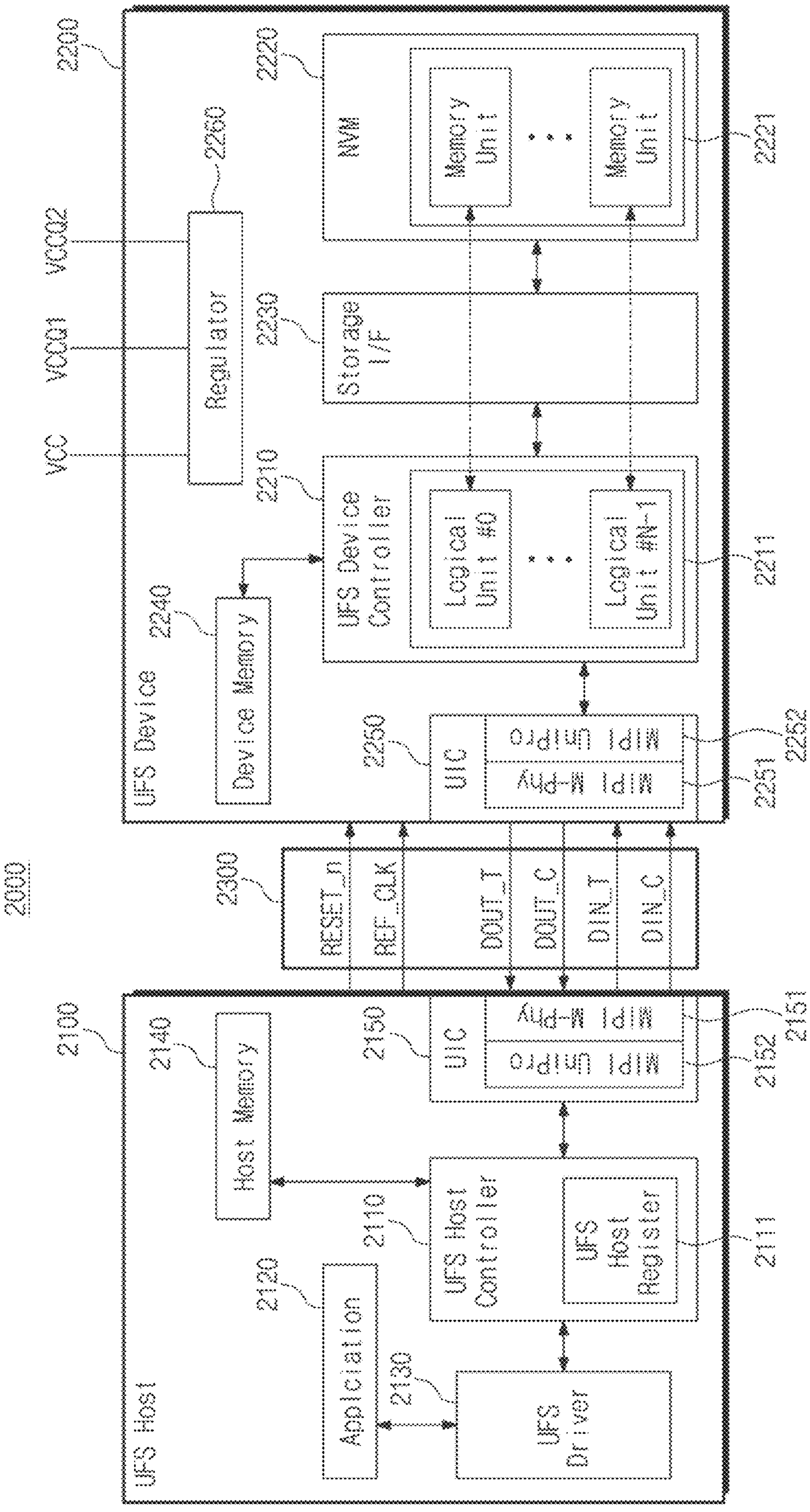
FIG. 3 illustrates a diagram of a UFS system 2000 according to an embodiment of the disclosure.

FIG. 3 is a diagram of a UFS system 2000 according to an embodiment. The UFS system 2000 may be a system conforming to a UFS standard announced by Joint Electron Device Engineering Council (JEDEC) and include a UFS host 2100, a UFS device 2200, and a UFS interface 2300. The above description of the system 1000 of FIG. 1 may also be applied to the UFS system 2000 of FIG. 3 within a range that does not conflict with the following description of FIG. 3.

Referring to FIG. 3, the UFS host 2100 may be connected to the UFS device 2200 through the UFS interface 2300. When the main processor 1100 of FIG. 1 is an AP, the UFS host 2100 may be implemented as a portion of the AP. The UFS host controller 2110 and the host memory 2140 may respectively correspond to the controller 1120 of the main processor 1100 and the memories 1200*a* and 1200*b* of FIG. 1. The UFS device 2200 may correspond to the storage device 1300*a* and 1300*b* of FIG. 1, and a UFS device controller 2210 and an NVM 2220 may respectively correspond to the storage controllers 1310*a* and 1310*b* and the NVMs 1320*a* and 1320*b* of FIG. 1.

The UFS host 2100 may include a UFS host controller 2110, an application 2120, a UFS driver 2130, a host memory 2140, and a UFS interconnect (UIC) layer 2150. The UFS device 2200 may include the UFS device controller 2210, the NVM 2220, a storage interface 2230, a device memory 2240, a UIC layer 2250, and a regulator 2260. The NVM 2220 may include a plurality of memory units 2221. Although each of the memory units 2221 may include a V-NAND flash memory having a 2D structure or a 3D structure, each of the memory units 2221 may include another kind of NVM, such as PRAM and/or RRAM. The UFS device controller 2210 may be connected to the NVM 2220 through the storage interface 2230. The storage interface 2230 may be configured to comply with a standard protocol, such as Toggle or ONFI.

The application 2120 may refer to a program that wants to communicate with the UFS device 2200 to use functions of the UFS device 2200. The application 2120 may transmit input-output requests (IORs) to the UFS driver 2130 for input/output (I/O) operations on the UFS device 2200. The IORs may refer to a data read request, a data storage (or write) request, and/or a data erase (or discard) request, without being limited thereto.

The UFS driver 2130 may manage the UFS host controller 2110 through a UFS-host controller interface (UFS-HCI). The UFS driver 2130 may convert the IOR generated by the application 2120 into a UFS command defined by the UFS standard and transmit the UFS command to the UFS host controller 2110. One IOR may be converted into a plurality of UFS commands. Although the UFS command may basically be defined by an SCSI standard, the UFS command may be a command dedicated to the UFS standard.

The UFS host controller 2110 may transmit the UFS command converted by the UFS driver 2130 to the UIC layer 2250 of the UFS device 2200 through the UIC layer 2150 and the UFS interface 2300. During the transmission of the UFS command, a UFS host register 2111 of the UFS host controller 2110 may serve as a command queue (CQ).

The UIC layer 2150 on the side of the UFS host 2100 may include a mobile industry processor interface (MIPI) M-PHY 2151 and an MIPI UniPro 2152, and the UIC layer 2250 on the side of the UFS device 2200 may also include an MIPI M-PHY 2251 and an MIPI UniPro 2252.

The UFS interface 2300 may include a line configured to transmit a reference clock signal REF_CLK, a line configured to transmit a hardware reset signal RESET_n for the UFS device 2200, a pair of lines configured to transmit a pair of differential input signals DIN_t and DIN_c, and a pair of lines configured to transmit a pair of differential output signals DOUT_t and DOUT_c.

A frequency of a reference clock signal REF_CLK provided from the UFS host 2100 to the UFS device 2200 may be one of 19.2 MHZ, 26 MHz, 38.4 MHz, and 52 MHz, without being limited thereto. The UFS host 2100 may change the frequency of the reference clock signal REF_CLK during an operation, that is, during data transmission/receiving operations between the UFS host 2100 and the UFS device 2200. The UFS device 2200 may generate cock signals having various frequencies from the reference clock signal REF_CLK provided from the UFS host 2100, by using a phase-locked loop (PLL). Also, the UFS host 2100 may set a data rate between the UFS host 2100 and the UFS device 2200 by using the frequency of the reference clock signal REF_CLK. That is, the data rate may be determined depending on the frequency of the reference clock signal REF_CLK.

The UFS interface 2300 may support a plurality of lanes, each of which may be implemented as a pair of differential lines. For example, the UFS interface 2300 may include at least one receiving lane and at least one transmission lane. In FIG. 3, a pair of lines configured to transmit a pair of differential input signals DIN_T and DIN_C may constitute a receiving lane, and a pair of lines configured to transmit a pair of differential output signals DOUT_T and DOUT_C may constitute a transmission lane. Although one transmission lane and one receiving lane are illustrated in FIG. 3, the number of transmission lanes and the number of receiving lanes may be changed.

The receiving lane and the transmission lane may transmit data based on a serial communication scheme. Full-duplex communications between the UFS host 2100 and the UFS device 2200 may be enabled due to a structure in which the receiving lane is separated from the transmission lane. That is, while receiving data from the UFS host 2100 through the receiving lane, the UFS device 2200 may transmit data to the UFS host 2100 through the transmission lane. In addition, control data (e.g., a command) from the UFS host 2100 to the UFS device 2200 and user data to be stored in or read from the NVM 2220 of the UFS device 2200 by the UFS host 2100 may be transmitted through the same lane. Accordingly, between the UFS host 2100 and the UFS device 2200, there may be no need to further provide a separate lane for data transmission in addition to a pair of receiving lanes and a pair of transmission lanes.

The UFS device controller 2210 of the UFS device 2200 may control all operations of the UFS device 2200. The UFS device controller 2210 may manage the NVM 2220 by using a logical unit (LU) 2211, which is a logical data storage unit. The number of LUs 2211 may be 8, without being limited thereto. The UFS device controller 2210 may include an FTL and convert a logical data address (e.g., a logical block address (LBA)) received from the UFS host 2100 into a physical data address (e.g., a physical block address (PBA)) by using address mapping information of the FTL. A logical block configured to store user data in the UFS system 2000 may have a size in a predetermined range. For example, a minimum size of the logical block may be set to 4 Kbyte.

When a command from the UFS host 2100 is applied through the UIC layer 2250 to the UFS device 2200, the UFS device controller 2210 may perform an operation in response to the command and transmit a completion response to the UFS host 2100 when the operation is completed.

As an example, when the UFS host 2100 intends to store user data in the UFS device 2200, the UFS host 2100 may transmit a data storage command to the UFS device 2200. When a response (a 'ready-to-transfer' response) indicating that the UFS host 2100 is ready to receive user data (ready-to-transfer) is received from the UFS device 2200, the UFS host 2100 may transmit user data to the UFS device 2200. The UFS device controller 2210 may temporarily store the received user data in the device memory 2240 and store the user data, which is temporarily stored in the device memory 2240, at a selected position of the NVM 2220 based on the address mapping information of the FTL.

As another example, when the UFS host 2100 intends to read the user data stored in the UFS device 2200, the UFS host 2100 may transmit a data read command to the UFS device 2200. The UFS device controller 2210, which has received the command, may read the user data from the NVM 2220 based on the data read command and temporarily store the read user data in the device memory 2240. During the read operation, the UFS device controller 2210 may detect and correct an error in the read user data by using an ECC engine embedded therein. More specifically, the ECC engine may generate parity bits for write data to be written to the NVM 2220, and the generated parity bits may be stored in the NVM 2220 along with the write data. During the reading of data from the NVM 2220, the ECC engine may correct an error in read data by using the parity bits read from the NVM 2220 along with the read data, and output error-corrected read data.

In addition, the UFS device controller 2210 may transmit user data, which is temporarily stored in the device memory 2240, to the UFS host 2100. In addition, the UFS device controller 2210 may further include an AES engine. The AES engine may perform at least of an encryption operation and a decryption operation on data transmitted to the UFS device controller 2210 by using a symmetric-key algorithm.

The UFS host 2100 may sequentially store commands, which are to be transmitted to the UFS device 2200, in the UFS host register 2111, which may serve as a common queue, and sequentially transmit the commands to the UFS device 2200. In this case, even while a previously transmitted command is still being processed by the UFS device 2200, that is, even before receiving a notification that the previously transmitted command has been processed by the UFS device 2200, the UFS host 2100 may transmit a next command, which is on standby in the CQ, to the UFS device 2200. Thus, the UFS device 2200 may also receive a next command from the UFS host 2100 during the processing of the previously transmitted command. A maximum number (or queue depth) of commands that may be stored in the CQ may be, for example, 32. Also, the CQ may be implemented as a circular queue in which a start and an end of a command line stored in a queue are indicated by a head pointer and a tail pointer.

Each of the plurality of memory units 2221 may include a memory cell array and a control circuit configured to control an operation of the memory cell array. The memory cell array may include a 2D memory cell array or a 3D memory cell array. The memory cell array may include a plurality of memory cells. Although each of the memory cells is a single-level cell (SLC) configured to store 1-bit information, each of the memory cells may be a cell configured to store information of 2 bits or more, such as a multi-level cell (MLC), a triple-level cell (TLC), and a quadruple-level cell (QLC). The 3D memory cell array may include a vertical NAND string in which at least one memory cell is vertically oriented and located on another memory cell.

Voltages VCC, VCCQ, and VCCQ2 may be applied as power supply voltages to the UFS device 2200. The voltage VCC may be a main power supply voltage for the UFS device 2200 and be in a range of 2.4 V to 3.6 V. The voltage VCCQ may be a power supply voltage for supplying a low voltage mainly to the UFS device controller 2210 and be in a range of 1.14 V to 1.26 V. The voltage VCCQ2 may be a power supply voltage for supplying a voltage, which is lower than the voltage VCC and higher than the voltage VCCQ, mainly to an I/O interface, such as the MIPI M-PHY 2251, and be in a range of 1.7 V to 1.95 V. The power supply voltages may be supplied through the regulator 2260 to respective components of the UFS device 2200. The regulator 2260 may be implemented as a set of unit regulators respectively connected to different ones of the power supply voltages described above.

Figure 4:
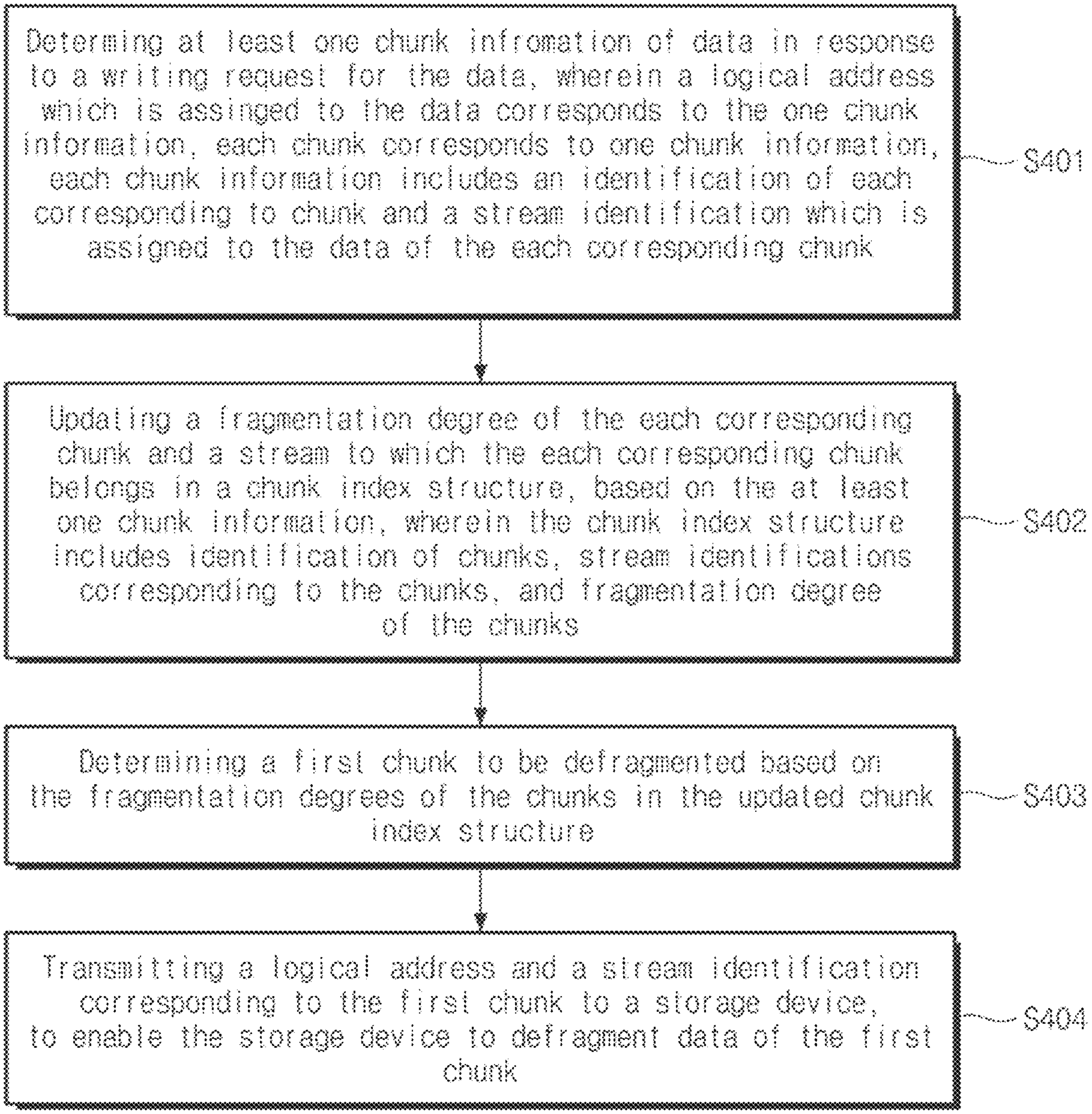
FIG. 4 illustrates a flowchart of a defragmentation method according to an embodiment of the disclosure.
Figure 5:
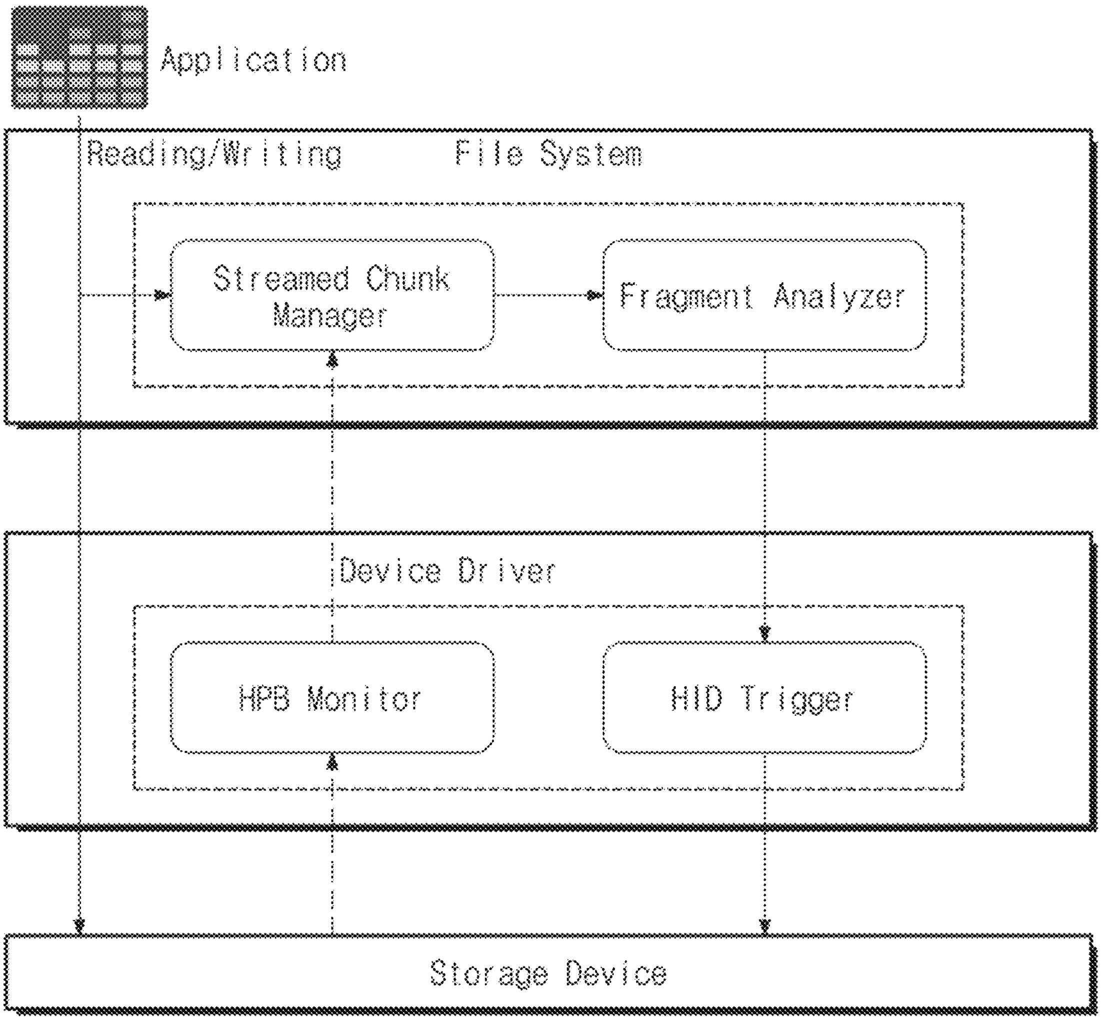
FIG. 5 illustrates a schematic diagram of an example of a defragmentation method according to an embodiment of the disclosure.

FIG. 4 illustrates a flowchart of a defragmentation method according to an embodiment of the disclosure. FIG. 5 illustrates a schematic diagram of an example of a defragmentation method according to an embodiment of the disclosure.

Figure 6:
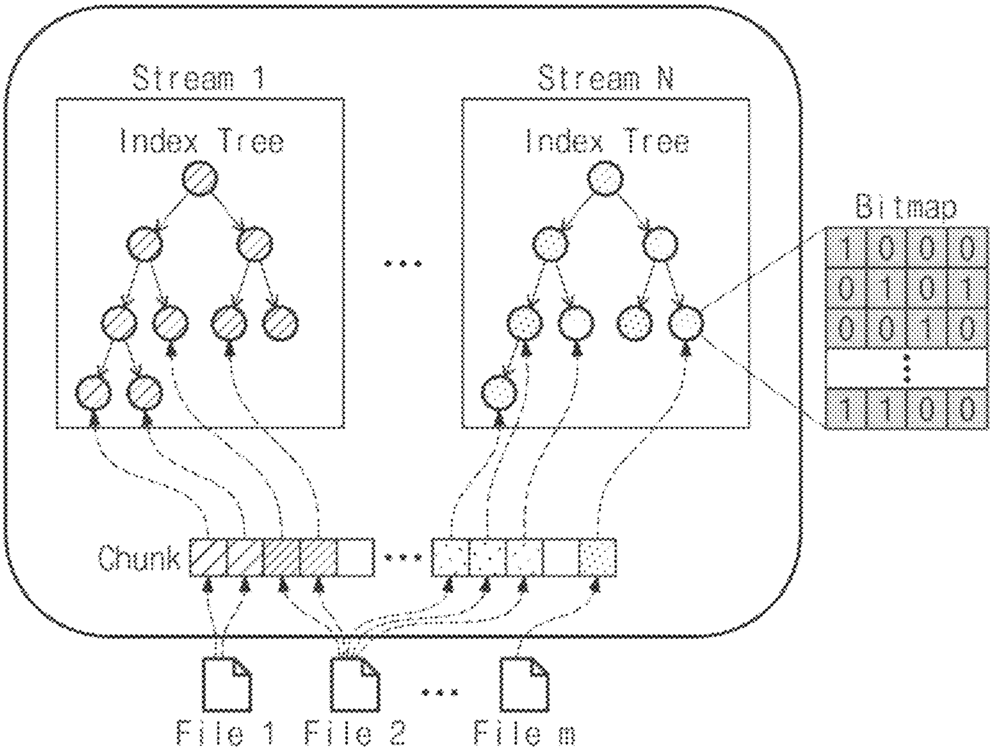
FIG. 6 illustrates a diagram of a processing of streaming chunks according to an embodiment of the disclosure.

A chunk is a contiguous block of data on a storage device, which may or may not be stored sequentially on the storage device. During defragmentation, fragmented chunks can be consolidated and placed sequentially (or otherwise organized) on the storage device. As described further below, streaming a plurality of chunks is used as a defragmentation technique according to several embodiments herein. FIG. 6 illustrates a diagram of a processing of streaming chunks according to an embodiment of the disclosure. The fragmentation method according to the embodiment of the disclosure will be described in detail below in connection with FIGS. 4 to 6.

Referring to FIG. 4, according to the embodiment of the disclosure, at step S401, at least one chunk information of data is determined in response to a writing request for the data, wherein a logical address which is assigned to the data corresponds to at least one chunk, each chunk corresponds to one chunk information, each chunk information includes an identification of each corresponding chunk and a stream identification which is assigned to the data of the each corresponding chunk.

Specifically, a file system (e.g., a Streamed Chunk Manager included in a file system in FIG. 5) divides the entire logical address space for storage into plurality of chunks having the same size, and assigns the divided chunks to a plurality of streams, which are streamed by the file system using a streaming technique (e.g., a streamed HID). In this case, in response to the writing request for the data, the logical address which is assigned to the data corresponds to one or more chunks, each chunk has corresponding chunk information, which includes the identification of this chunk and the assigned stream identification corresponding to the chunk. Referring to FIG. 5, the streamed chunk manager in the file system manages and maintains chunk information on the streamed chunks. Here, the chunk may be assigned to the stream by any appropriate streaming technique, which is not described in detail.

According to the embodiment of the disclosure, the chunk may include, but is not limited to, a section of a logical address range, a data block, etc. According to the embodiment of the disclosure, the size of the chunk chunk_size may be arbitrarily configured, for example, may be set by default to a size of a Segment in a F2FS file system (i.e., 2 MB).

According to the embodiment of the disclosure, the file system may number the plurality of divided chunks, that is, the identification of the corresponding chunk (chunk_id) assigned for the plurality of chunks may include a numerical number. For example, when 100 chunks are divided, the file system assigns identifications of the chunks with a value from 1 to 100.

According to the embodiment of the disclosure, the file system may number the plurality of streams, that is, a corresponding stream identification for each stream may include a numerical number. According to the embodiment of the disclosure, data that is assigned to one stream may be stored in the same area.

For example, referring to FIG. 5, when an application writes data of a certain file in response to a writing request for the data, the file system (e.g., the streamed chunk manager) converts logical addresses to which the data of this file is written, into a plurality of chunk information of a plurality of chunks corresponding to the written logical addresses, wherein one chunk information corresponds to one chunk, and this chunk information includes a chunk identification (chunk_id) assigned to this chunk by the file system and a stream identification (sid) of a stream to which the chunk is assigned by the file system.

At step S402, a fragmentation degree of the each corresponding chunk and a stream to which the each corresponding chunk belongs in a chunk index structure are updated, based on the at least one chunk information, wherein the chunk index structure includes identifications of chunks, stream identifications corresponding to the chunks, and fragmentation degrees of the chunks. Specifically, the fragmentation degree of the file may change due to I/O operations of the file system, which requires updating the fragmentation degree of the file According to the embodiment of the disclosure, the one or more chunks have a chunk index structure (e.g., a tree structure or any structure that may be implemented by indexes), and a location of each chunk in the chunk index structure is determined based on a fragmentation degree α of each chunk. That is, a key value of the index is the fragmentation degree α of the chunk.

According to the embodiment of the disclosure, the one or more chunks may have a plurality of chunk index structures divided based on streams.

According to the embodiment of the disclosure, the fragmentation degree α of the chunk is a metric for measuring whether defragmentation is to be performed, which is a unitless value. An initial default value of the fragmentation degree α may be 0. For example, the larger the value of the fragmentation degree, the higher fragmentation degree the data is, the more fragmentations the data has, and accordingly, the slower the data is read.

The plurality of chunk index structures divided based on the streams is described in detail below with reference to FIG. 6. In FIG. 6, data of each of files/to file m may be distributed on one or more chunks. A plurality of chunks corresponding to file 1 may be assigned to stream 1, a plurality of chunks corresponding to file 2 may be assigned to both stream/and stream 2, and one chunk corresponding to file m may be assigned to stream 2. Each stream in FIG. 6 has a chunk index tree structure of which each node represents one chunk, and a location of the chunk in the tree structure is determined based on a fragmentation degree α of the chunk. For example, a plurality of chunks corresponding to a plurality of nodes in a top-to-bottom and/or left-to-right order, respectively, may sequentially have an increasing fragmentation degree, or a plurality of chunks corresponding to, respectively, a plurality of sub-nodes of the same node may have the same fragmentation degree. For example, the fragmentation degree increases as the number of layers of the structure at which the node is located increases.

According to the embodiment of the disclosure, managing chunks corresponding to data of a file in a streaming manner (e.g., fragmenting the file at physical addresses using a Streamed HID technology) can ensure that the data of the file is stored on a storage device (e.g., a UFS storage device) in an optimal manner, thereby improving an I/O performance.

According to the embodiment of the disclosure, the chunk information further includes: the number of pages of the each corresponding chunk occupied by data, and a starting page number of the data in the each corresponding chunk. Specifically, the each chunk includes several pages, wherein each page has a page number (page_number). When data is assigned to a chunk, the data occupies some pages in the chunk. In this case, the chunk information further includes the number of pages of the each corresponding chunk occupied by the data, and the starting page number of the data in the each corresponding chunk.

According to the embodiment of the disclosure, the number of pages of the each corresponding chunk occupied by the data may include the number of consecutive pages of the corresponding chunk occupied by the data, which may also be referred to as a length (length).

According to the embodiment of the disclosure, the chunk information may include, but is not limited to, a quaternary information <chunk_id, page_number, length, sid> associated with a chunk identification chunk_id, a starting page number page_number, a length, and a stream identification sid, but is not limited thereto. Here, the chunk identification chunk_id may represent the identification of the corresponding chunk, the starting page number page_number may represent the starting page number of the several pages in the corresponding chunk at which the address to which data is written, the length may represent the number of consecutive pages in the corresponding chunk occupied by the address to which data is written, and the stream identification sid may represent the identification of the stream of the corresponding chunk assigned by the file system.

According to the embodiment of the disclosure, a size of the page may be arbitrarily configured, for example, may be set to 4 KB by default. According to the embodiment of the disclosure, in a default case, the number of all pages included in one chunk may be 512.

According to an embodiment of the disclosure, the address to which data is written may be converted to the chunk information and the chunk information may be stored.

For example, referring to FIG. 5, the streamed chunk manager in the file system performs the above processing of converting the chunk information and transmits the converted chunk information (e.g., the quaternary information) to a fragment analyzer in the file system.

According to the embodiment of the disclosure, the updating the fragmentation degree of the each corresponding chunk in the chunk index structure includes: updating the fragmentation degree of the each corresponding chunk, based on the number of the pages of the each corresponding chunk occupied by the data and a fragmentation degree of the each corresponding chunk recorded in the chunk index structure.

Specifically, the updating the fragmentation degree of the each corresponding chunk, based on the number of the pages of the each corresponding chunk occupied by the data and the fragmentation degree of the each corresponding chunk recorded in the chunk index structure, includes: updating a fragment value f of the each corresponding chunk based on the number of the pages of the each corresponding chunk occupied by the data, the number of all pages included in the each corresponding chunk, and the fragmentation degree of the each corresponding chunk recorded in the chunk index structure; determining the fragmentation degree α of the each corresponding chunk based on the updated fragment value f of the each corresponding chunk.

According to the embodiment of the disclosure, a fragmentation value f is a metric for measuring the amount of fragment of a chunk, which is a unitless value. The initial default value of the fragmentation value f may be 0.

Specifically, firstly, a fragment value increment Δf is calculated according to Equation (1), and then the fragment value f of the each corresponding chunk is updated according to Equation (2):

$$\Delta f = \frac{P}{L} - 1 \tag{1}$$

$$f = f_0 + \Delta f \tag{2}$$

wherein P represents the number of all pages in one chunk; L represents the number of pages occupied by data included in the chunk information, such as, the length; $f_0$ represents a fragment value of the chunk recorded in the chunk index structure, i.e., the last updated fragment value, and $f_0$ is 0 by fault if there is no last update.

According to the embodiment of the disclosure, the updated fragment value f in every time may be recorded in the chunk index structure, to be used as $f_0$ for the next update.

According to the embodiment of the disclosure, the method further includes: updating a bitmap of the each corresponding chunk according to the at least one chunk information, setting the bitmap of the pages occupied by the data to 1. For example, referring to FIG. 6, each chunk has one corresponding bitmap, and a location in the bitmap corresponds to a page included in the chunk, i.e., the location in the bitmap may be determined based on the page number.

According to the embodiment of the disclosure, the updating the fragmentation degree of the each corresponding chunk in the chunk index structure includes: updating the fragmentation degree of the each corresponding chunk, based on the number of the pages of the each corresponding chunk occupied by the data, the fragmentation degree of the each corresponding chunk recorded in the chunk index structure, and the number of 1 in the bitmap of the each corresponding chunk.

Specifically, with reference to FIG. 5, for one chunk, the fragment analyzer may receive chunk information of this chunk and save the chunk information. For example, when a load on a system (e.g., a CPU) is low, the identification of the chunk (chunk_id) included in the chunk information may be used as an index to obtain the chunk information, which includes a bitmap of the chunk, associated with the chunk from the file system, and the information of the bitmap of this chunk may be used to update the state of the chunk.

According to the embodiment of the disclosure, the step of updating the fragmentation degree of the corresponding chunk in the chunk index structure further includes: updating values of bits starting from the starting page number in the bitmap of the corresponding chunk to 1 based on the number of pages of the each corresponding chunk occupied by the data, and the starting page number of the data in the each corresponding chunk, wherein the number of the bits is the number of pages occupied by the data. Specifically, when the bitmap of the chunk is acquired, a values of bits in the bitmap corresponding to, respectively, values of page_number, page_number+1, . . . , and page_number+length−1 is set to 1 based on the chunk information of the chunk.

According to the embodiment of the disclosure, the updating the fragmentation degree of the each corresponding chunk, based on the number of the pages of the each corresponding chunk occupied by the data, the fragmentation degree of the each corresponding chunk recorded in the chunk index structure, and the number of 1 in the bitmap of the each corresponding chunk, includes: updating the fragment value f of the each corresponding chunk, based on the number of the pages of the each corresponding chunk occupied by the data, the number of all pages included in the each corresponding chunk, and the fragmentation degree of the each corresponding chunk recorded in the chunk index structure; determining the fragmentation degree α of the each corresponding chunk based on the updated fragment value f of the each corresponding chunk and the number of 1 in the bitmap of the each corresponding chunk.

Herein, the fragment value f is updated for the each corresponding chunk by using the above Equations (1) and (2), which are not repeatedly described here.

Then, the fragmentation degree α is determined for the each corresponding chunk according to the following equation (3):

$$\alpha = f \times \log_2 d \tag{3}$$

Wherein d represents the number of bits having a value of 1 in the current bitmap of the chunk.

According to the above equations, the file system may update the state (e.g., a fragmentation degree) of the corresponding chunk in time based on any piece of chunk information when the load on the system is low, thereby avoiding an inability to accurately perform a defragmentation operation due to an inconsistency between the chunk information of the stored chunk and an actual state of the chunk.

Since I/O operations of the file system or the last defragmentation may cause a stream to which a chunk currently belongs, different from the latest stream to which the file system has assigned the chunk, thus, the stream to which the each corresponding chunk belongs is also updated based on the at least one chunk information.

According to the embodiment of the disclosure, the updating the stream to which the each corresponding chunk belongs in the chunk index structure includes: determining whether a stream identification which is assigned to the data is the same as a stream identification corresponding to the each corresponding chunk in the chunk index structure; updating the stream identification corresponding to the each corresponding chunk in the chunk index structure if different. That is, when the current latest assigned stream of the chunk does not match the stream identification in the chunk index structure, the stream identification corresponding to the chunk in the chunk index structure is adjusted.

According to the embodiment of the disclosure, the chunk index structure includes a chunk index structure of each stream; the updating the stream identification corresponding to the each corresponding chunk in the chunk index structure if different includes: removing the each corresponding chunk in the chunk index structure of the corresponding stream of the each corresponding chunk; adding the each corresponding chunk to a chunk index structure of the stream to which the data is assigned.

According to the embodiment of the disclosure, a location of the each corresponding chunk in the corresponding chunk index structure is determined based on the updated fragmentation degree of the each corresponding chunk. That is, the location of the chunk in the chunk index structure of the each stream may be adjusted based on the latest fragmentation degree of the chunk.

Specifically, the stream identification sid of the corresponding chunk which is assigned to the data by the file system, is compared with the stream identification of the chunk index structure that the chunk is currently in, and the chunk is moved to the corresponding chunk index structure to make the state of the chunk consistent with the chunk information, when the chunk is not in the chunk index structure of the assigned stream identification sid.

When the stream identification sid of the chunk is the same as the stream identification of the chunk index structure that the chunk is currently in, it represents that the chunk is in the appropriate chunk index structure. Therefore, the location of the chunk in the chunk index structure is adjusted based on only the latest fragmentation degree of the chunk.

On the contrary, when the stream identification sid of the chunk is different from the stream identification of the chunk index structure that the chunk is currently in, it represents that the chunk is not in the appropriate chunk index structure. Therefore, the chunk is removed from the current chunk index structure and inserted into a chunk index structure in a stream corresponding to the stream identification sid of the chunk, and the inserted location corresponds to the latest fragmentation degree of the chunk. As such, the state of the chunk is updated by updating the stream to which the each corresponding chunk belongs and/or the location in the chunk index structure.

Since the file system assigns a new stream identification sid to the chunk every time data is distributed according to a mechanism, whether a chunk is to be defragmented is more accurately determined by adjusting the stream to which it belongs and/or its location in the chunk index structure in time based on the chunk information, thereby improving the efficiency of defragmentation.

The defragmentation method according to the embodiment of the disclosure may update state of chunks corresponding to data in time to perform defragmentation. For example, when the load on the system is low, the state of the chunks may be updated based on the chunk information and other related information of the chunks.

At step S403, a first chunk to be defragmented is determined based on the fragmentation degrees of the chunks in the updated chunk index structure.

According to the embodiment of the disclosure, the method further includes: recording a file writing frequency and/or a file size.

According to the embodiment of the disclosure, the step of determining a first chunks for defragmentation based on the fragmentation degree of a chunks in an updated chunk index structure includes: determining a first file of which a file size is greater than a first threshold and\or a file writing frequency is greater than a second threshold; determining a fragmentation degree of a second chunk corresponding to data of the first file, from the chunk index structure of the each stream; if the fragmentation degree of the second chunk is greater than a third threshold, determining the second chunk as the first chunk; removing a node corresponding to the first chunk from a chunk index structure of a stream corresponding to the first chunk. That is, for a file that is too large in size or is written more frequently, chunks each having a greater fragmentation degree of this file are defragmented. For example, with reference to FIG. 5, the file system (e.g., the fragment analyzer), when the load on the system is low, may traverse files that are larger in size or are frequently written, to determine whether to perform defragmentation.

According to the embodiment of the disclosure, the determining a fragmentation degree of a second chunk corresponding to data of the first file, from the chunk index structure of the each stream, includes: determining, stream by stream, the fragmentation degree of the second chunk corresponding to the data of the first file. By such the determining, stream by stream, the fragmentation degree of the second chunk associated with the data of the file, it is possible to determine, stream by stream, the first chunk(s) that will be fragmented.

According to the embodiment of the disclosure, the chunk index structure of the each stream is a red-black tree, each chunk corresponds to one node, a location of the each corresponding chunk in the red-black tree is determined according to the fragmentation degree of the each corresponding chunk; the third threshold is a fragmentation degree of a chunk at a root node of a red-black tree of a stream corresponding to the second chunk.

According to the embodiment of the disclosure, by determining, stream by stream, whether a chunk is defragmented for each chunk associated with data of a file, it is possible to perform defragmentation analysis globally while minimizing communication overhead. In addition, when defragmentation analysis is performed, the analysis may be performed based on only the chunk information to filter chunks that are to be defragmented, thereby reducing computational overhead and avoiding waste of storage resources.

At step S404, a logical address and a stream identification corresponding to the first chunk are transmitted to a storage device, to enable the storage device to defragment data of the first chunk.

According to the embodiment of the disclosure, the storage device defragments the data of the first chunk by: defragmenting the data of the first chunk using a Host Initiated Defrag (HID). For example, referring to FIG. 5, the fragment analyzer may inform the HID Trigger in a Device Driver to perform the fragmentation.

According to the embodiment of the disclosure, the storage device defragments the data of the first chunk by: inserting the first chunk into a defragmentation queue; defragmenting the data of the first chunk using the HIDs; and reinserting the defragmented chunks in the defragmentation queue in a chunk index structure corresponding to the received stream identification.

According to the embodiment of the disclosure, the inserting the first chunk into the defragmentation queue includes: moving the first chunk from the previous chunk index structure into the defragmentation queue. For example, referring to FIG. 5, when the HID trigger receives a notification of defragmentation, logical address ranges of all chunks in the defragmentation queue are transmitted to the storage device (e.g., a UFS storage device) via the HID function. The UFS storage device may perform the defragmentation.

After the defragmentation is performed, chunk information of the chunk may be updated. According to the embodiment of the disclosure, the method further includes: setting the bitmap of the first chunk to 0 and resetting a defragmentation degree of the first chunk, in response to a defragmentation completion message transmitted by the storage device; and adding the first chunk to the chunk index structure of the stream corresponding to the first chunk.

According to the embodiment of the disclosure, when the defragmentation is performed, only the chunks to be defragmented are inserted into the defragmentation queue and reinserted into the chunk index structure of the corresponding stream after the defragmentation, without a plurality of interactions with the storage device. As such, a communication overhead of frequent interactions with the storage device is reduced, and a garbage collection overhead of the storage device is reduced because a stream in which the chunk is located remains unchanged, which mitigates an impact of defragmentation on a lifetime of the storage device.

In addition, since the defragmentation is performed entirely by the storage device (e.g., a UFS storage device), a software overhead is correspondingly reduced.

In addition, at any point in system running, a migration of data may occur in the storage device, at which point a HPB Monitor may receive address update information from the storage device (e.g., a UFS storage device), the defragmentation method according to the embodiment of the disclosure may process correspondingly.

According to the embodiment of the disclosure, the method further includes: receiving address update information transmitted by the storage device, the address update information including a logical address and a physical address of data; determining an identification of a corresponding chunk and an identification of a page based on the logical address; setting a page corresponding to the identification of the page to 1 based on the identification of the corresponding chunk and the identification of the page.

According to the embodiment of the disclosure, the identification of the page may include a starting page number and/or the number of the corresponding pages.

According to the embodiment of the disclosure, the setting a page corresponding to the identification of page to 1 based on the identification of the corresponding chunk and the identification of page, includes: determining a corresponding bitmap based on the identification of the corresponding chunk; setting a value of a bit corresponding to a starting page number and/or the number of the corresponding pages in the bitmap of the corresponding chunk to 1.

For example, referring to FIG. 5, when the HPB monitor receives address update information (e.g., HPB update information) from the storage device, the HPB monitor may determine a identification chunk_id and a starting page number page_number of the corresponding updated chunk based on a logical address in the address update information, and may set the corresponding bit in the corresponding bitmap to 1.

As such, even if data migration occurs, the chunk information may be modified accordingly for subsequent processing (e.g., a fragmentation degree update processing). The calculation accuracy of fragmentation degree may be improved, by using a HPB technology to obtain additional information about migrating data by the storage device.

Figure 7:
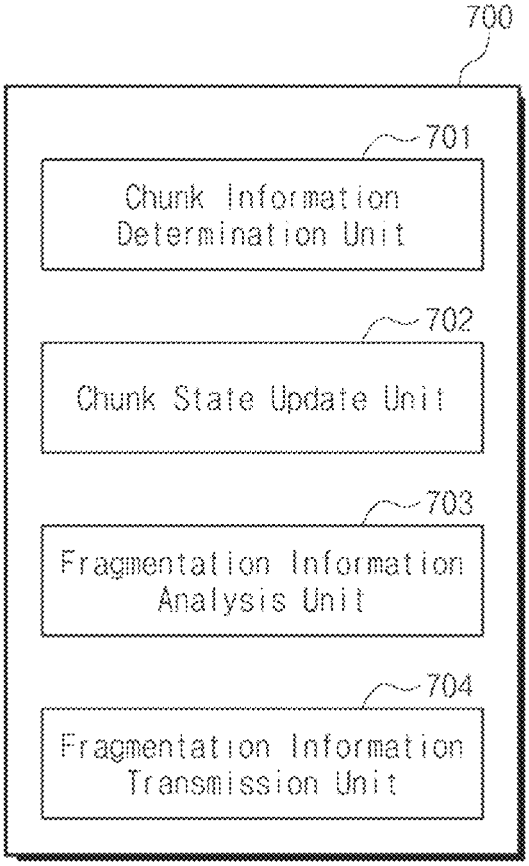
FIG. 7 illustrates a block diagram of a structure of a defragmentation apparatus according to an embodiment of the disclosure.

A defragmentation apparatus according to an embodiment of the disclosure will be described below with reference to FIG. 7. FIG. 7 illustrates a block diagram of a structure of a defragmentation apparatus according to the embodiment of the disclosure.

Referring to FIG. 7, a defragmentation apparatus 700 may include a chunk information determination unit 701, a chunk state update unit 702, a fragmentation information analysis unit 703, and a fragmentation information transmission unit 704.

According to the embodiment of the disclosure, the chunk information determination unit 701 may be configured to: determine at least one chunk information of data in response to a writing request for the data, wherein a logical address which is assigned to the data corresponds to at least one chunk, each chunk corresponds to one chunk information, each chunk information includes an identification of each corresponding chunk and a stream identification which is assigned to the data of the each corresponding chunk. That is, the chunk information determination unit 701 may be configured to perform an operation corresponding to step S401 as described above with reference to FIGS. 4 to 6. Herein, the chunk information determination unit 701 may be included, for example, in the streamed chunk manager in FIG. 5 and may be used to perform operations corresponding to the operations of the streamed chunk manager.

According to the embodiment of the disclosure, the chunk state update unit 702 may be configured to: update a fragmentation degree of the each corresponding chunk and a stream to which the each corresponding chunk belongs in a chunk index structure, based on the at least one chunk information, wherein the chunk index structure includes identifications of chunks, stream identifications corresponding to the chunks, and fragmentation degrees of the chunks. That is, the chunk state update unit 702 may be configured to perform an operation corresponding to step S402 as described above with reference to FIGS. 4 to 6. Herein, the chunk state update unit 702 may be included, for example, in the streamed chunk manager in FIG. 5, and may be used to perform operations corresponding to the operations of the streamed chunk manager.

According to the embodiment of the disclosure, the fragmentation information analysis unit 703 may be configured to: determine a first chunk to be defragmented based on the fragmentation degrees of the chunks in the updated chunk index structure. That is, the fragmentation information analysis unit 703 may be configured to perform an operation corresponding to step S403 as described above with reference to FIGS. 4 to 6. Herein, the fragmentation information analysis unit 703 may be included, for example, in the fragment analyzer in FIG. 5 and may be used to perform operations corresponding to the operations of the fragmentation analyzer.

According to the embodiment of the disclosure, the fragmentation information transmission unit 704 may be configured to: transmit a logical address and a stream identification corresponding to the first chunk to a storage device, to enable the storage device to defragment data of the first chunk. That is, the fragmentation information transmission unit 704 may be configured to perform an operation corresponding to step S404 as described above with reference to FIGS. 4 to 6. The fragmentation information transmission unit 704 may be included, for example, in the HID trigger in FIG. 5 and may be used to perform operations corresponding to the operations of the HID trigger.

According to the embodiment of the disclosure, the chunk information may further include: the number of pages of the each corresponding chunk occupied by data, and a starting page number of the data in the each corresponding chunk.

According to the embodiment of the disclosure, the chunk state update unit 702 may be configured to update the fragmentation degree of the each corresponding chunk in the chunk index structure by: updating the fragmentation degree of the each corresponding chunk, based on the number of the pages of the each corresponding chunk occupied by the data and a fragmentation degree of the each corresponding chunk recorded in the chunk index structure.

According to the embodiment of the disclosure, the apparatus 700 may further include a bitmap update unit configured to: update a bitmap of the each corresponding chunk according to the at least one chunk information, setting the bitmap of the pages occupied by the data to 1. According to the embodiment of the disclosure, the chunk state update unit 702 may be configured to update the fragmentation degree of the each corresponding chunk in the chunk index structure by: updating the fragmentation degree of the each corresponding chunk, based on the number of the pages of the each corresponding chunk occupied by the data, the fragmentation degree of the each corresponding chunk recorded in the chunk index structure, and the number of 1 in the bitmap of the each corresponding chunk.

According to the embodiment of the disclosure, the chunk state update unit 702 may be configured to: update the stream to which each of the corresponding chunks in the chunk index structure belongs by: determining whether a stream identification which is assigned to the data is the same as a stream identification corresponding to the each corresponding chunk in the chunk index structure; updating the stream identification corresponding to the each corresponding chunk in the chunk index structure if different.

According to the embodiment of the disclosure, the chunk index structure may include a chunk index structure of each stream; the chunk state update unit 702 is configured to update the stream identification corresponding to the each corresponding chunk in the chunk index structure if different, by: removing the each corresponding chunk in the chunk index structure of the corresponding stream of the each corresponding chunk; adding the each corresponding chunk to a chunk index structure of the stream to which the data is assigned.

According to the embodiment of the disclosure, the apparatus 700 may further include a file recording unit configured to record a file writing frequency and/or a file size. According to the embodiment of the disclosure, the fragmentation information analysis unit 703 may be configured to determine the first chunk to be defragmented based on the fragmentation degrees of the chunks in the updated chunk index structure by: determining a first file of which a file size is greater than a first threshold and/or a file writing frequency is greater than a second threshold; determining a fragmentation degree of a second chunk corresponding to data of the first file, from the chunk index structure of the each stream; if the fragmentation degree of the second chunk is greater than a third threshold, determining the second chunk as the first chunk; removing a node corresponding to the first chunk from a chunk index structure of a stream corresponding to the first chunk.

According to the embodiment of the disclosure, the chunk index structure of each stream may be a red-black tree, each chunk corresponds to one node, a location of the each corresponding chunk in the red-black tree is determined according to the fragmentation degree of the each corresponding chunk; the third threshold is a fragmentation degree of a chunk at a root node of a red-black tree of a stream corresponding to the second chunk.

According to the embodiment of the disclosure, the apparatus 700 may further include a chunk state reset unit configured to: set the bitmap of the first chunk to 0 and reset a defragmentation degree of the first chunk, in response to a defragmentation completion message transmitted by the storage device; and add the first chunk to the chunk index structure of the stream corresponding to the first chunk.

According to the embodiment of the disclosure, the apparatus 700 may further include an address update processing unit configured to: receive address update information transmitted by the storage device, the address update information including a logical address and a physical address of data; determine an identification of a corresponding chunk and an identification of a page based on the logical address; set pages corresponding to the identification of the page to 1 based on the identification of the corresponding chunk and the identification of the page. Herein, the address update processing unit may be included, for example, in the HID monitor in FIG. 5 and may be used to perform operations corresponding to the operations of the HID monitor.

According to the embodiment of the disclosure, the storage device defragments the data of the first chunk by: defragmenting the data of the first chunk using a Host Initiated Defrag (HID).

With respect to the defragmentation apparatus 700 in the above embodiments, the specific manner in which the respective unit performs operations thereof has been described in detail in the embodiments of the related method, and will not be described in detail here.

Further, it should be understood that the respective unit in the defragmentation apparatus 700 according to the embodiment of the disclosure may be implemented as hardware components and/or software components. Those skilled in the art may, for example, use a field-programmable gate array (FPGA) or an application-specific integrated circuit (ASIC) to implement the individual units, depending on the processing performed by the individual units as defined.

According to an embodiment of the disclosure, an electronic apparatus is also provided, which including: at least one processor, and at least one memory storing computer executable instructions, wherein the computer executable instructions, when being executed by the at least one processor, cause the at least one processor to perform the defragmentation method described as above.

According to the embodiment of the disclosure, the electronic apparatus may be a PC computer, a tablet device, a personal digital assistant, a smartphone, or other devices capable of executing the above set of instructions. Herein, the electronic apparatus does not have to be a single electronic apparatus, but may also be an assembly of any device or circuit that is capable to execute the above instructions (or instruction sets) individually or jointly. The electronic apparatus may also be a part of an integrated control system or system manager, or may be configured as a portable electronic apparatus that is interfaced with a local or remote (e.g., via wireless transmission).

In the electronic apparatus, the processor may include a central processing unit (CPU), a graphics processing unit (GPU), a programmable logic device, a specialized processor system, a microcontroller, or a microprocessor. By way of example and not limitation, processors may also include an analog processor, a digital processor, a microprocessor, a multicore processor, a processor array, a network processor, and the like.

The processor may execute the instructions or codes stored in the memory, wherein the memory may also store data. The instructions and data may also be transmitted and received through a network via a network interface device, wherein network interface device may adopt any known transmission protocol.

The memory may be integrated with the processor, for example, by placing a RAM or flash memory within an integrated circuit microprocessor, etc. In addition, the memory may include an independent device, such as, an external disk driver, a storage array, or other storage devices that may be used by any database system. The memory and processor may be coupled operationally, or they may communicate with each other, such as through an I/O port, a network connection, etc., so that the processor is capable of reading a file stored in the memory.

In addition, the electronic apparatus may also include a video display (such as, a LCD display) and a user interaction interface (such as, a keyboard, mouse, touch input device, etc.). All components of the electronic apparatus may be connected to each other through a bus and/or network.

According to an embodiment of the disclosure, a computer-readable storage medium is also provided, wherein instructions in the computer-readable storage medium, when being executed by at least one processor, cause the at least one processor to perform the defragmentation method according to an embodiment of the disclosure.

According to the embodiment of the disclosure, the computer-readable storage medium includes: read only memory (ROM), random access programmable read only memory (PROM), electrically erasable programmable read only memory (EEPROM), random access memory (RAM), dynamic random access memory (DRAM), static random access memory (SRAM), flash memory, non-volatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, Blu-ray or optical disc storage, hard disk drive (HDD), solid state hard disk (SSD), card memory (such as a multimedia card, secure digital (SD) card, or extreme digital (XD) card), magnetic tape, floppy disk, magneto-optical data storage device, optical data storage device, hard disk, solid state disk, and any other devices configured to store the computer applications and any associated data, data files and data structures in a non-transitory manner, and provide the computer applications and any associated data, data files and data structures to a processor or computer so that the processor or computer can execute the computer applications. The computer applications in the above-mentioned computer readable-storage medium can be executed in an environment deployed in a computer device such as a client, a host, a proxy device, a server, etc. in addition, in one example, the computer applications and any associated data, data files and data structures are distributed over networked computer systems so that the computer applications and any associated data, data files and data structures are stored, accessed and executed in a distributed manner by one or more processors or computers.

After considering the description and practicing the disclosure disclosed herein, those skilled in the art are easily think of other embodiments of the disclosure. The disclosure intends to cover any variation, use or adaptation of the disclosure, which follow general principles of the disclosure and include the common general knowledge or frequently used technical means in the technical field, which are not disclosed in the disclosure. The description and the embodiments are only regarded as examples, and the true scope and spirit of the disclosure are indicated by the claims.

While certain example embodiments the disclosure have been particularly shown and described, it will be understood that various changes in form and details may be made therein without departing from the spirit and scope of the following claims.

What is claimed is:

1. A defragmentation method, comprising:

acquiring at least one chunk information of data in response to a writing request for the data, wherein the at least one chunk information comprises an identification of at least one chunk and a stream identification assigned to data of the at least one chunk, and wherein a logical address assigned to the data corresponds to a plurality of chunks including the at least one chunk;

updating a fragmentation degree of each of the at least one chunk and a stream to which the each of the at least one chunk belongs in a chunk index structure to obtain an updated chunk index structure, based on the at least one chunk information, wherein the chunk index structure comprises identifications of the plurality of chunks, stream identifications corresponding to the plurality of chunks, and fragmentation degrees of the plurality of chunks;

determining a first chunk to be defragmented, based on the fragmentation degrees of the plurality of chunks in the updated chunk index structure; and transmitting a first logical address and a first stream identification corresponding to the first chunk to a storage device, to enable the storage device to defragment data of the first chunk, wherein the fragmentation degree of each of the at least one chunk corresponds to a number of fragmentations in each of the at least one chunk, wherein the chunk index structure of the each stream is a tree structure, each of the plurality of chunks corresponding to a node, and a location of the node being determined according to the fragmentation degree of the at least one chunk, wherein the updating of the fragmentation degree of the at least one chunk in the chunk index structure comprises:

updating a bitmap of the at least one chunk according to the at least one chunk information, the bitmap of a number of pages occupied by the data being set to 1; and updating the fragmentation degree of the at least one chunk, based on the number of the pages of the at least one chunk occupied by the data, the fragmentation degree of the at least one chunk recorded in the chunk index structure, and a number of bits set to 1 in the bitmap of the at least one chunk.

2. The method according to claim 1, wherein the at least one chunk information further comprises: the number of the pages of the at least one chunk occupied by the data, and a starting page number of the data in the at least one chunk.

3. The method according to claim 2, wherein the updating the stream to which the at least one chunk belongs in the chunk index structure comprises:

determining whether the stream identification which is assigned to the data is the same as the stream identification corresponding to the at least one chunk in the chunk index structure; and updating the stream identification corresponding to the at least one chunk in the chunk index structure if different.

4. The method according to claim 3, wherein the chunk index structure comprises chunk index structures of each of a plurality of streams, and wherein the updating the stream identification corresponding to the at least one chunk in the chunk index structure comprises:

removing the at least one chunk in the chunk index structure of the stream of the at least one chunk; and adding the at least one chunk to the chunk index structure of the stream to which the data is assigned.

5. The method according to claim 4, wherein the method further comprises: recording a file writing frequency and/or a file size, wherein the determining the first chunk to be defragmented based on the fragmentation degrees of the plurality of chunks in the updated chunk index structure comprises:

determining a first file of which the file size is greater than a first threshold and/or the file writing frequency is greater than a second threshold;

determining a first fragmentation degree of a second chunk corresponding to data of the first file, from the chunk index structure of the each of the plurality of streams;

based on the first fragmentation degree of the second chunk being greater than a third threshold, determining that the second chunk is the first chunk; and removing a node corresponding to the first chunk from the chunk index structure of a first stream corresponding to the first chunk.

6. The method according to claim 5, wherein the third threshold is a second fragmentation degree of a chunk at a root node of a red-black tree of a stream corresponding to the second chunk.

7. The method according to claim 5, wherein the method further comprises:

setting the bitmap of the first chunk to 0 and resetting a defragmentation degree of the first chunk, in response to a defragmentation completion message transmitted by the storage device; and adding the first chunk to the chunk index structure of the first stream corresponding to the first chunk.

8. The method according to claim 2, wherein the method further comprises:

receiving address update information transmitted by the storage device, the address update information comprising an update logical address and a physical address of data;

determining an identification of a corresponding chunk and an identification of a page based on the update logical address; and setting the page corresponding to the identification of the page to 1 based on the identification of the corresponding chunk and the identification of the page.

9. The method according to claim 1, wherein the storage device defragments the data of the first chunk by:

defragmenting the data of the first chunk using a Host Initiated Defrag (HID).

10. A defragmentation apparatus, comprising:

at least one memory storing instructions; and at least one processor configured to execute the instructions to:

determine at least one chunk information of data in response to a writing request for the data, wherein a logical address which is assigned to the data corresponds to at least one chunk, each chunk corresponds to one chunk information, each chunk information comprises an identification of at least one chunk and a stream identification which is assigned to the data of the at least one chunk;

update a fragmentation degree of the at least one chunk and a stream to which the at least one chunk belongs in a chunk index structure to obtain an updated chunk index structure, based on the at least one chunk information, wherein the chunk index structure comprises identifications of a plurality of chunks, stream identifications corresponding to the plurality of chunks, and fragmentation degrees of the plurality of chunks;

determine a first chunk to be defragmented based on the fragmentation degrees of the plurality of chunks in the updated chunk index structure; and transmit a first logical address and a first stream identification corresponding to the first chunk to a storage device, to enable the storage device to defragment data of the first chunk, wherein the fragmentation degree of each of the at least one chunk corresponds to a number of fragmentations in each of the at least one chunk, wherein the chunk index structure of the each stream is a tree structure, each of the plurality of chunks corresponding to a node, and a location of the node being determined according to the fragmentation degree of the at least one chunk, and wherein the at least one processor is further configured to execute the instructions to:

update a bitmap of the at least one chunk according to the at least one chunk information, the bitmap of a number of pages occupied by the data being set to 1; and update the fragmentation degree of the at least one chunk, based on the number of the pages of the at least one chunk occupied by the data, the fragmentation degree of the at least one chunk recorded in the chunk index structure, and a number of bits set to 1 in the bitmap of the at least one chunk.

11. The defragmentation apparatus according to claim 10, wherein the chunk information further comprises: the number of the pages of the at least one chunk occupied by data, and a starting page number of the data in the at least one chunk.

12. The defragmentation apparatus according to claim 11, wherein the at least one processor is further configured to execute the instructions to update the stream to which the at least one chunk belongs in the chunk index structure belongs by:

determining whether the stream identification which is assigned to the data is the same as the stream identification corresponding to the at least one chunk in the chunk index structure; and updating the stream identification corresponding to the at least one chunk in the chunk index structure if different.

13. The defragmentation apparatus according to claim 12, wherein the chunk index structure comprises chunk index structures of each of a plurality of streams, and the at least one processor is further configured to execute the instructions to update the stream identification corresponding to the at least one chunk in the chunk index structure if different, by:

removing the at least one chunk in the chunk index structure of the stream of the at least one chunk; and adding the at least one chunk to the chunk index structure of the stream to which the data is assigned.

14. The defragmentation apparatus according to claim 13, wherein the at least one processor is further configured to execute the instructions to:

record a file writing frequency and/or a file size; and determine the first chunk to be defragmented based on the fragmentation degrees of the plurality of chunks in the updated chunk index structure by:

determining a first file of which the file size is greater than a first threshold and/or the file writing frequency is greater than a second threshold;

determining a first fragmentation degree of a second chunk corresponding to data of the first file, from the chunk index structure of the each stream;

if the first fragmentation degree of the second chunk is greater than a third threshold, determining the second chunk as the first chunk; and removing a node corresponding to the first chunk from the chunk index structure of a first stream corresponding to the first chunk.

15. The defragmentation apparatus according to claim 14, wherein the third threshold is a second fragmentation degree of a chunk at a root node of a red-black tree of a stream corresponding to the second chunk.

16. The defragmentation apparatus according to claim 14, wherein the at least one processor is further configured to execute the instructions to:

set the bitmap of the first chunk to 0 and reset a defragmentation degree of the first chunk, in response to a defragmentation completion message transmitted by the storage device; and add the first chunk to the chunk index structure of the first stream corresponding to the first chunk.

17. The defragmentation apparatus according to claim 11, wherein the at least one processor is further configured to execute the instructions to:

receive address update information transmitted by the storage device, the address update information comprising an update logical address and a physical address of data;

determine an identification of a corresponding chunk and an identification of a page based on the update logical address; and set the page corresponding to the identification of the page to 1 based on the identification of the corresponding chunk and the identification of the page.

18. A computer-readable storage medium, wherein instructions in the computer-readable storage medium, when being executed by at least one processor, cause the at least one processor to perform a defragmentation method comprising:

acquiring at least one chunk information of data in response to a writing request for the data, wherein the at least one chunk information comprises an identification of at least one chunk and a stream identification assigned to data of the at least one chunk, and wherein a logical address assigned to the data corresponds to a plurality of chunks including the at least one chunk;

updating a fragmentation degree of each of the at least one chunk and a stream to which the each of the at least one chunk belongs in a chunk index structure to obtain an updated chunk index structure, based on the at least one chunk information, wherein the chunk index structure comprises identifications of the plurality of chunks, stream identifications corresponding to the plurality of chunks, and fragmentation degrees of the plurality of chunks; and determining a first chunk to be defragmented, based on the fragmentation degrees of the plurality of chunks in the updated chunk index structure, wherein the fragmentation degree of each of the at least one chunk corresponds to a number of fragmentations in each of the at least one chunk, wherein the chunk index structure of the each stream is a tree structure, each of the plurality of chunks corresponding to a node, and a location of the node being determined according to the fragmentation degree of the at least one chunk, and wherein the updating the fragmentation degree of the at least one chunk in the chunk index structure comprises:

updating a bitmap of the at least one chunk according to the at least one chunk information, the bitmap of a number of pages occupied by the data being set to 1; and updating the fragmentation degree of the at least one chunk, based on the number of the pages of the at least one chunk occupied by the data, the fragmentation degree of the at least one chunk recorded in the chunk index structure, and a number of bits set to 1 in the bitmap of the at least one chunk.

* * * * *